United States Patent
Beller

(10) Patent No.: US 6,388,741 B1
(45) Date of Patent: May 14, 2002

(54) LOCALIZATION OF FAULTS IN AN OPTICAL FIBER

(75) Inventor: Josef Beller, Hildrizhausen (DE)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/212,733

(22) Filed: Dec. 16, 1998

(30) Foreign Application Priority Data

Feb. 16, 1998 (EP) .............................. 98102603

(51) Int. Cl.$^7$ .............................. G01N 21/00
(52) U.S. Cl. .............................. 356/73.1
(58) Field of Search .............................. 356/73.1; 359/110, 359/130, 161, 177, 341, 339, 337, 349; 385/37, 12

(56) References Cited

U.S. PATENT DOCUMENTS 5,903,375 A * 5/1999 Horiuchi et al. ............ 359/177

* cited by examiner

Primary Examiner—Frank G. Font
Assistant Examiner—Tu T. Nguyen

(57) ABSTRACT

An optical fiber is provided with a plurality of reflecting events spatially allocated along the optical fiber for localizing possible faults in the optical fiber. Possible faults are localized by emitting a signal into the optical fiber, measuring the reflected signals, and comparing the measured reflected signals with expected signals representing the optical fiber without faults. In case that there are one or more faults in the optical fiber, the measured reflected signals in a distance behind each one of the one or more faults will show at least a different amplitude, or even disappear, with respect to the expected signals. The expected signals can be received or determined, e.g., from a previous measurement, such as an acceptance measurement, or can be calculated or otherwise received from theoretical analysis (e.g. simulation or modeling) and/or from information about the fiber (such as physical properties).

9 Claims, 2 Drawing Sheets

LOCALIZATION OF FAULTS IN AN OPTICAL FIBER

BACKGROUND OF THE INVENTION

The present invention relates to the localization of faults in fiber optic systems.

Optical time domain reflectometers (OTDRs) are state of the art instruments to localize failures (e.g. breaks, bends, mechanical stress etc.) in fiber optic systems or networks comprising one or more fiber links e.g. for connecting one or more optical components. The reflectometric principle has evolved to a widely accepted technique for capturing backscatter signals because of its suitability for one-port measurements with distance ranges up to 200 km and even more.

An OTDR injects a pulsed signal into a fiber optic network comprising one or more optical components, e.g. fibers, filters, couplers, or the like. The pulsed signal typically is a laser pulse at a certain laser wavelength. A small amount of the pulsed signal is continuously scattered back in the opposite direction towards the OTDR, representing attenuation, loss, and reflectance in the optical network under test. By measuring the amount of backscattered and/or reflected signal versus time, the loss versus distance of the optical network is measured. The results of one or more individual measurements are usually combined and that combination represents an OTDR trace of the optical network. In a typical OTDR trace received from an OTDR measurement, the x-axis corresponds to the distance between the OTDR and a location in the optical network. The y-axis shows the power level of the reflected signal level revealing details about the optical link loss in the optical network. A detailed description of the current knowledge about OTDRs and analyses of OTDR traces is given in detail by the inventor in the book by Dennis Derickson: "Fiber optic test and measurement", ISBN 0-13-534330-5, 1998 on pages 434 ff.

The OTDR allows the localization of faults in fiber optic systems by evaluating OTDR traces interpreting faults as specific discontinuities. This evaluation, however, finds a 'natural' limitation in particular for spatially extended fiber optic systems (e.g. long fibers) where the backscattered signal eventually becomes lower than the OTDR receiver's noise level.

A further limitation of the applicability of OTDR measurements for localization faults in fiber optic systems occurs when fiber optic links equipped with erbium doped amplifiers (EDFAs) need to be tested. In this environment, the standard OTDR faces some obstacles. Firstly, an EDFA produces considerable optical ASE noise (amplified spontaneous emission) which dazzles a sensitive instrument like an OTDR if no precautions were taken. This problem can be tackled e.g. with a narrow-band optical filter in the receiver path. Secondly, EDFAs commonly contain optical isolators that prevent scattered and reflected light from returning to the input port. Thirdly, the very high signal levels in an EDFA transmission link can show nonlinear interference with an OTDR's probe signal.

SUMMARY OF THE INVENTION

It is an object of the invention to provide an improved possibility to localize faults in fiber optic systems. The object is solved by the independent claims. Preferred embodiments are shown by the dependent claims.

According to the invention, a spatially elongated optical element, such as an optical fiber, is provided with a plurality of reflecting events that are spatially allocated along the optical element.

Possible faults in the optical element are localized by emitting a signal into the optical element, measuring signals reflected from the reflecting events, and comparing the measured reflected signals with expected signals representing the optical element without faults. In case that there are no faults in the optical element, the measured reflected signals will substantially correspond to the expected signals. In case that there are one or more faults in the optical element, the measured reflected signals in a distance behind each one of the one or more faults will be attenuated to a certain degree, or, in other words, show at least a different (e.g. decreased) amplitude, or even disappear, with respect to the expected signals.

The invention can be executed by a system comprising means for emitting an optical signal into the optical element and means for measuring the reflected signals. This can be embodied e.g., by an OTDR as known in the art. The system further comprises means for comparing the measured reflected signals with expected signals representing the optical element without faults. This can be embodied and executed e.g. by a data processing unit which might be part of an OTDR or provides a separate device.

The expected signals can be received or determined, e.g. from a previous measurement, such as an acceptance measurement, or can be calculated or otherwise received for example from theoretical analysis (e.g. simulation or modeling) and/or from information about the fiber (such as physical properties).

This allows that a measurement of signals reflected at one or more of the plurality of the reflecting events provides information about possible faults in the optical element.

The reflecting events can be represented by any location where a change of the refractive index occurs and are preferably gratings such as fiber Bragg gratings.

The reflecting events can be embodied as individual devices, e.g. between successive parts of the optical element such as individual fiber parts, but are preferably incorporated within the optical element, e.g. as fiber Bragg gratings.

In a preferred embodiment, the reflectance value of each reflecting event is determined to depend on the distance to a measuring point at which the reflected signals are measured. Preferably, the reflectance values increase with increasing distance to the measuring point to compensate the attenuation of the element. This allows receiving reflected signals with substantially constant amplitudes independent of the distance of the reflecting event. This also allows reducing an influence of possible broadband noise sources, such as EDFAs, on the measurements.

The reflecting events are preferably selected to provide a defined reflectance characteristics versus wavelength. In a preferred embodiment, reflecting events, such as Bragg gratings, are used which provide a specific center wavelength at which a signal is reflected or partially reflected, while substantially all other wavelengths are not reflected.

In a preferred embodiment, the reflecting events are selected to provide different reflectance characteristics versus wavelength for different wavelengths. This allows employing measurements with different measuring wavelengths to localize individual reflecting events corresponding to the respective wavelength(s). This way the reflectance values of the reflecting events at a specific wavelength can be chosen independently and need not depend on the reflectivity and the associated insertion loss of the reflecting events at the other wavelengths. In that case, measurements for determining the time dependencies of the reflected signals are not required in order to clearly assign a specific reflected signal to a specific reflecting event.

The fault localizing according to the invention can be applied to single optical elements, e.g. for monitoring a specific fiber, and/or to an optical network comprising one or more individual elongated optical elements (e.g. fiber segments) that might be coupled between (optically non-elongated) optical components, such as optical filters, switches, or the like. In case that reflected signals from different reflecting events within the optical system to be measured/monitored exhibit the same characteristics, additional information has to be gathered in order to distinguish the different reflecting events. Such information can be time information e.g. the time between emitting a measuring signal and receiving the reflected signal as automatically determined by an OTDR.

Instead of one reflective event at a given location a pair or more than two reflective events can be grouped together to generate a specific pattern of reflections. Such a pattern can be detected easily and automatically directs to a specific location.

When optical amplifiers, such as EDFAs, are employed between successive optical elements, or parts thereof, each one of those optical elements is preferably provided with a sequence of reflecting elements with distance dependent reflectance values and/or with different reflectance characteristics versus wavelength for different wavelengths. This allows localizing faults in each one of the optical elements. In case that optical isolators are employed preventing scattered and/or reflected light from returning to the input measuring port, a loop back path (for back-travelling signals) or other adequate means might have to be provided to ensure that the reflected signals can return to the measuring point.

The measuring frequency is preferably selected to differ from possible or actual transmission frequencies applied on the optical element e.g. for communication purposes, so that the measurement can be executed independently of such 'traffic' on the optical element(s).

Other advantages versus the conventional OTDR measurements are:

- strong return signals, since reflected signals are generally much stronger than backscattered signals,
- high measurement speed, due to the normally stronger reflected signals (compared with the backscattered signals) which do not require excessive signal averaging over the time,
- code correlation is possible to further enhance SNR,
- live fiber monitoring is possible independent of fiber traffic, and
- backscatter measurements are not necessary.

BRIEF DESCRIPTION OF THE DRAWINGS

Other objects and many of the attendant advantages of the present invention will be readily appreciated and become better understood by reference to the following detailed description when considering in connection with the accompanied drawings in which.

DETAILED DESCRIPTION OF THE INVENTION

Figure 1A:
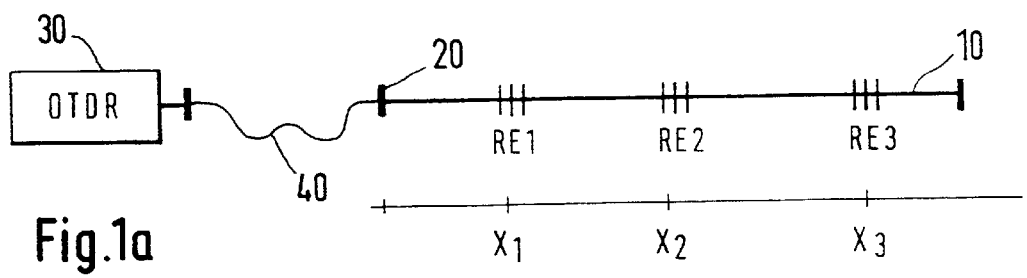
FIGS. 1a–1d show an optical fiber 10 according to the invention and respective OTDR traces for examples according to the invention.

FIG. 1a shows an optical fiber 10 according to the invention. The fiber 10 comprises as a 'fault coding' a first reflective event RE1 at a location x1 (from a first end 20 of the fiber 10), a second reflective event RF2 at a location x2, and a third reflective event RE3 at a location x3. The reflective events REi can either be provided at equal distances or otherwise distributed over the length of the fiber 10. In particular for monitoring faults in specific locations of the fiber 10, one or more reflective events REi might be provided in a predetermined pattern within such specific locations. In the embodiment of FIG. 1a, the reflective events REi are provided by gratings, preferably Bragg gratings.

For localizing/monitoring faults in the fiber 10, an OTDR 30 is coupled either directly or via a fiber network 40 to the fiber 10. In operation, the OTDR 30 emits a measuring signal to the fiber 10 and measures signals reflected from the fiber 10. For assessing whether a fault has occurred in the fiber 10, the OTDR 30 compares the measured reflected signals with expected signals representing the fiber 10 without faults. The expected signals are preferably signals from a former measurement or from an initial measurement of the fiber 10.

Figure 1B:
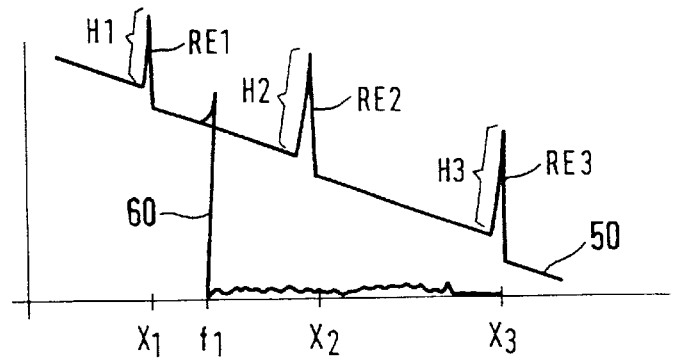

FIG. 1b shows an example of an OTDR trace 50 of the fiber 10 determined by the OTDR 30 for the fiber 10 of FIG. 1a in a fault-less condition. A second OTDR trace 60 of the same fiber 10 depicts a case wherein a fault occurs at a location f1 between the reflective events RE1 and RE2. In this case, the reflected signals from the reflective events RE2 and RE3 have been entirely disappeared because of a complete interrupt of the fiber 10 at f1 e.g. due to a fiber break.

In the example of FIG. 1b, the reflective events are provided with substantially equal reflectance values, so that the heights H1, H2, and H3 of the respective reflectance peaks, with respect to the last measured value before the respective reflective event $RE_i$, are substantially equal.

Figure 1C:
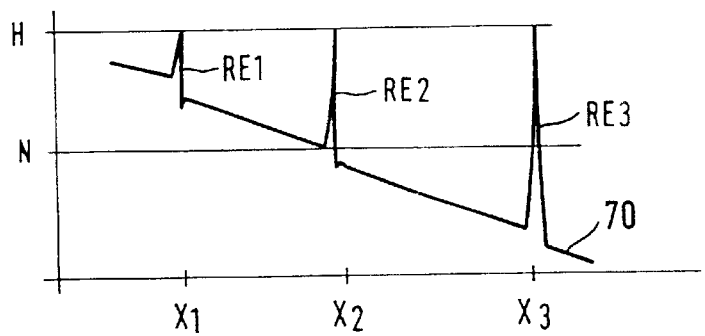

FIG. 1c shows an OTDR trace 70 of another example, wherein the reflectance values of the reflective events $RE_i$. reflective events are selected in a way that the absolute amplitude H, with respect to a defined absolute level, is substantially equal for reflective events REi. This is in particular advantageous in cases where the signal level of the OTDR trace 70 (at least partly) falls below a noise level N, so that the signal level of the measured signal (with exception of the reflectance peaks from the reflective events $RE_i$) is lower than the noise level N. This allows determining faults between successive reflective events $RE_i$ over long distances even when a backscatter analyses is not possible anymore due to the noise level N.

In an embodiment for the example of FIG. 1c, wherein the intervening fiber segments between the reflective events $RE_i$ and $RE_{i+1}$ exhibit the attenuation $A_1$, the reflectance value $r_{i+1}$, for a following reflective event $RE_{i+1}$ is selected to compensate for two times the attenuation $A_i$.

Figure 1D:
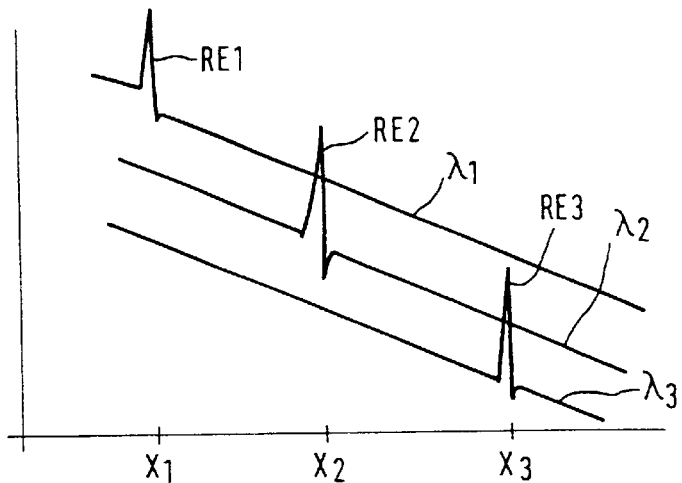

FIG. 1d depicts another example of the fiber 10, wherein the reflectance values of the reflective events $RE_i$ exhibit different wavelength dependencies. In FIG. 1d, the frequencies $\lambda_i$ of the measuring signals from the OTDR 30 are selected in a way that the frequencies $\lambda_i$ coincide with the center reflecting frequencies of the reflective events $RE_i$. For the sake of clarity, the three OTDR traces in FIG. 1d are depicted vertically spaced to each other.

The OTDR traces depicted in the FIGS. 1 exhibit a certain insertion loss for each reflective event $RE_i$, indicated by vertical displacements of the reflected signal from the fiber 10 at the locations $x_i$ (cf. also the aforementioned book by Dennis Derickson e.g. on page 457). It is clear, however, that the respective insertion loss value depends on the respective type and embodiment of the reflective event $RE_i$.

It is apparent that one or more fibers 10, e.g. as depicted in FIG. 1a, with identical or different fault coding can be applied for connecting other optical components. Although the OTDR traces will be more complex in that case, the principles of the invention are the same and can be applied thereto accordingly.

The invention shall now be explained for an example of locating fiber breaks and losses in EDFA links. However, it is clear that the invention can be used for any optical fiber arrangement with or without optical amplifiers. Further more, the example is based on measurements with different wavelengths and on reflecting events with different wavelength dependencies. However, it is clear that the principle of the invention does not require different wavelengths and that measurements with one wavelength and reflecting events with similar or identical wavelength dependencies can also be employed. In that case, the reflectance values are preferably adopted to depend on the distance from a measuring point, e.g. in a way that the reflectance increases with increasing distance, so that substantially constant amplitudes of the reflected signals can be received.

The invention avoids backscatter measurements in favor of improved immunity to high ASE signals, increased measurement speed, and enhanced measurement range. Instead of backscatter, the invention evaluates reflections on the link which were generated by reflecting events such as gratings e.g. worked into the fibers. Such gratings (e.g. fiber Bragg gratings) preferably act as partially blocking filters when exposed to light at selected wavelengths.

Figure 2A:
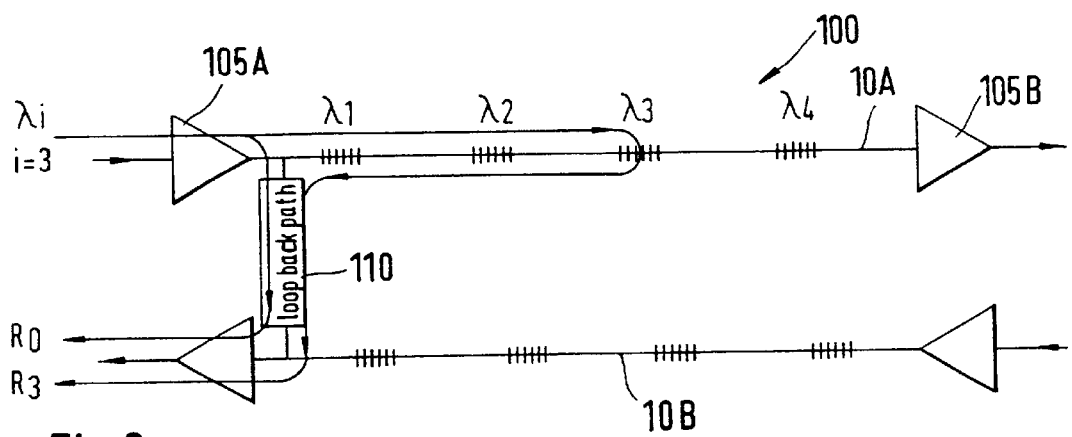
FIGS. 2a–2d show an example of locating fiber breaks and losses in an EDFA link and examples for OTDR traces therefrom.

In a preferred embodiment as depicted in FIG. 2a, an optical fiber link 100 is furnished with gratings, preferably Bragg gratings, with different blocking wavelengths $\lambda_i$ embedded at different locations into a fiber segment 10A. The number of gratings, more precisely the distance between them, determines the spatial resolution at which a fault can be located. Probing the fiber 10A under test with light pulses at a wavelength that hits the center frequency $\lambda_i$ of such a grating causes a fraction of the pulses to reflect and travel back in the opposite direction. In case of a fault between successive gratings, the first grating (from the direction of the measuring point) still reflects the measuring signals while the fault fully or partly prevents the measuring signals to travel to the second grating, or at least attenuates them. In the arrangement of FIG. 2a, the fiber segment 10A is coupled between optical amplifiers 105A and 105B.

In case isolators block the optical reverse path, a loop-back path 110 is preferably provided, which feeds the reflections into another fiber 10B that carries the signals to the input port. The loop back path 110 can incorporate a forward path and a path for back-reflected light as well. In EDFA links (e.g. undersea links), this can be solved easily, because fibers are normally running in pairs. Such bi-directional links commonly are realized by two unidirectional fibers transmitting signals in opposite directions. An arrangement consisting of optical couplers that connects both unidirectional fibers can provide such a return path.

For a complete check of the fiber link 100 as depicted in FIG. 2a, a number of light pulses at different wavelengths $\lambda_i$ with i=1,2,3,... is launched towards the fiber 10A. The fiber 10A responds to each individual probe signal with a returning pulse $R_i$ that can be assigned to a specific location by the measured round trip times. A fiber break or additional link loss can be discovered and located by continuously comparing the height of the individual reflections $R_i$ with expected values for a fiber without faults. In case of a fault, the heights of the individual reflections $R_i$ after the fault will be different (here: decreased) compared to the expected values, or even disappear.

Figure 2B:
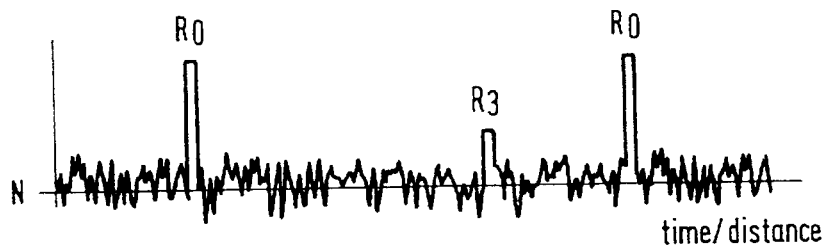

FIG. 2b shows a single pulse (or code) measurement at $\lambda_3$ which gives a return signal with a wavelength independent part $R_0$ (this is part of the forward travelling signal) and a wavelength dependent reflection $R_3$ at a position that corresponds to the location of fiber grating $\lambda_3$. The fiber attenuation accounts for the smaller height of $R_3$.

Figure 2C:
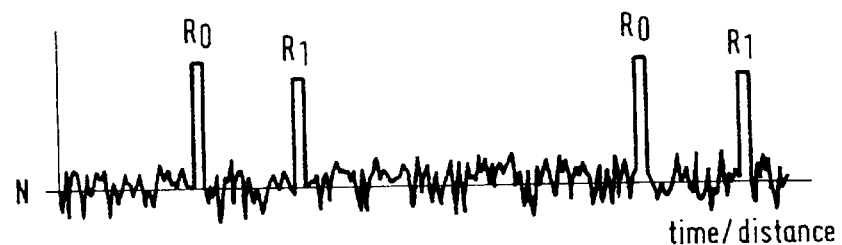

FIG. 2c shows the same measurement as in FIG. 2c at wavelength $\lambda_1$.

Figure 2D:
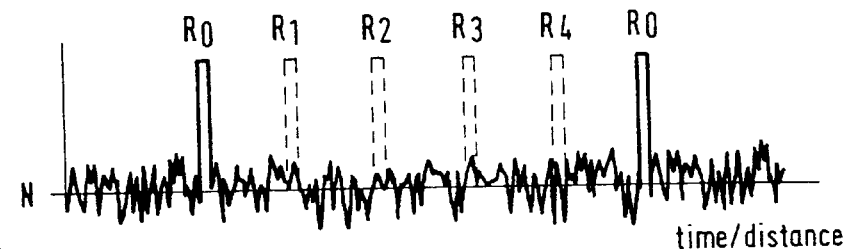

FIG. 2d shows a measurement on the link 100 with adjusted reflectance values that result in equal reflection heights. In case of a fiber break between the locations of $R_2$ and $R_3$ the reflections $R_3$ and $R_4$ cannot be detected any more.

The FIGS. 2b–d show OTDR traces for ranges where the backscattered signals are below the noise level N. Thus, only the returning pulses $R_i$ exceed the noise level N.

The measuring wavelengths are preferably selected to wavelengths at which the transmission link 100 does not show too much attenuation. The center wavelengths $\lambda_i$ of the gratings should be chosen not to interfere with traffic signals on the link, i.e. other signals used e.g. for communication purposes. E.g. $\lambda_i$ can either fit between an ITU (International Telecommunication Union) grid for DWDM (dense wavelength division multiplexing) systems, or lie outside the traffic band.

The reflectance values of the fiber gratings can be chosen to compensate for the fiber's attenuation. This way, the measured return signals can be adopted to provide substantially equal strength. If, for example, the link loss is approximately 10 dB, then the first grating should have a reflectance 20 dB lower than the last one on the link. This has the additional advantage that the reflected amount of ASE power is much smaller.

Since only the peak of reflections has to be measured, a code correlation scheme can be applied without the cumbersome problems with auto-correlation sidelobes superimposed to a backscatter signal.

What is claimed is:

1. A method for localizing possible faults in a spatially elongated optical element comprising:

providing a plurality of reflecting events spatially allocated along the elongated optical element, each of said plurality of reflecting events having a reflectance value wherein the reflectance values of one or more of said plurality of reflecting events depend on the distance to a measuring point at which the reflected signals are measured and further wherein the reflectance values increase with increasing distance to the measuring point;

injecting a signal into the optical element to provide a reflected signal, measuring the reflected signal at said measuring point, and localizing possible faults by comparing the measured reflected signal with a signal representing the optical element without faults determined from theoretical analysis including said reflectance values of said plurality of reflecting events.

2. The method of claim 1, wherein said injected signal comprises a measuring frequency selected to differ from possible or actual transmission frequencies applied on the optical element.

3. A spatially elongated optical element comprising a plurality of reflecting events spatially allocated along the optical element for localizing possible faults in the optical element, each of said plurality of reflecting events having a reflectance value wherein the reflectance values of one or more of said plurality of reflecting events depend on the distance to a measuring point at which the reflected signals are measured and further wherein the reflectance values increase with increasing distance to the measuring point.

4. The optical element of claim 3, wherein the reflectance values are selected in a way that the amplitude of signals reflected at the reflecting events is substantially equal.

5. The optical element of claim 3, wherein the reflecting events are embodied as individual devices, or incorporated within the optical element.

6. The optical element of claim 3, wherein one or more of the reflecting events provide a defined reflectance characteristics versus wavelength.

7. The optical element of claim 6, wherein the one or more of the reflecting events provide different reflectance characteristics versus wavelength for different wavelengths.

8. The optical element of claim 3, wherein at least two reflecting events are grouped together to generate a specific pattern of reflections.

9. A system for localizing possible faults in a spatially elongated optical element comprising:

a plurality of reflecting events spatially allocated along the elongated optical element, each of said plurality of reflecting events having a reflectance value wherein the reflectance values of one or more of said plurality of reflecting events depend on the distance to a measuring point at which the reflected signals are measured and further wherein the reflectance values increase with increasing distance to the measuring point;

means for injecting a signal into the elongated optical element to provide a reflected signal, means for measuring the reflected signal, and means for comparing the measured reflected signal with a signal representing the optical element without faults determined from theoretical analysis including said reflectance values of said plurality of reflecting events.

\* \* \* \* \*